(12) United States Patent
    Gupta et al.

(10) Patent No.: US 11,321,133 B2
(45) Date of Patent: May 3, 2022

(54) DETERMINING AN ALLOCATION OF STAGE AND DESTAGE TASKS BY USING A MACHINE LEARNING MODULE

(71) Applicant: International Business Machines Corporation, Armonk, NY (US)

(72) Inventors: Lokesh M. Gupta, Tucson, AZ (US); Kyler A. Anderson, Sahuarita, AZ (US); Matthew G. Borlick, Tucson, AZ (US); Kevin J. Ash, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 985 days.

(21) Appl. No.: 16/004,321

(22) Filed: Jun. 8, 2018

(65) Prior Publication Data

US 2019/0377609 A1    Dec. 12, 2019

(51) Int. Cl.
    *G06F 9/50*      (2006.01)
    *G06N 20/00*     (2019.01)
    *G06F 3/06*      (2006.01)
    *G06F 9/48*      (2006.01)

(52) U.S. Cl.
    CPC ............ *G06F 9/5038* (2013.01); *G06F 3/061* (2013.01); *G06F 3/0659* (2013.01); *G06F 3/0689* (2013.01); *G06F 9/4806* (2013.01); *G06N 20/00* (2019.01)

(58) Field of Classification Search
    None
    See application file for complete search history.

(56) References Cited

U.S. PATENT DOCUMENTS

| | | | |
|---|---|---|---|
| 2004/0255026 A1 | 12/2004 | Blount et al. | |
| 2006/0294301 A1* | 12/2006 | Zohar | G06F 12/0804 |
| | | | 711/113 |
| 2011/0191534 A1 | 8/2011 | Ash et al. | |
| 2012/0041914 A1 | 2/2012 | Tirunagari | |
| 2012/0124294 A1 | 5/2012 | Atkisson et al. | |

(Continued)

OTHER PUBLICATIONS

International Search Report and Written Opinion, dated Aug. 12, 2019, for International Application No. PCT/EP2019/064199, Total 17 pages.

(Continued)

*Primary Examiner* — Scott C Sun
(74) *Attorney, Agent, or Firm* — Konrad Raynes Davda & Victor LLP; David W. Victor

(57) ABSTRACT

Provided are a computer program product, system, and method for using a machine learning module to determine an allocation of stage and destage tasks. Storage performance information related to processing of Input/Output (I/O) requests with respect to the storage unit is provided to a machine learning module. The machine learning module receives a computed number of stage tasks and a computed number of destage tasks. A current number of stage tasks allocated to stage tracks from the storage unit to the cache is adjusted based on the computed number of stage tasks. A current number of destage tasks allocated to destage tracks from the cache to the storage unit is adjusted based on the computed number of destage tasks.

25 Claims, 9 Drawing Sheets

(56) References Cited

U.S. PATENT DOCUMENTS

| | | | |
|---|---|---|---|
| 2013/0007425 A1* | 1/2013 | Cantin | G06F 9/3848 |
| | | | 712/240 |
| 2013/0132667 A1 | 5/2013 | Benhase et al. | |
| 2017/0353396 A1 | 12/2017 | Burke et al. | |
| 2018/0081823 A1 | 3/2018 | Benhase et al. | |

OTHER PUBLICATIONS

Wikipedia, "Linear Regression" dated May 29, 2018, (online) retrieved from the Internet at URL>ht tps ://en. w iki pedia .org/w li n<lex. php ?ti tie= Li near_rcgrcss ion&old id=84 34 23504, Total 19 pages.

U.S. Appl. No. 16/137,233, filed Sep. 20, 2018, entitled "Determining an Allocation of Stage and Destage Tasks By Training a Machine Learning Module", invented by L. M. Gupta et al., Total 50 pp.

Preliminary Amendment for U.S. Appl. No. 16/137,233 , pp. 14, dated Sep. 20, 2018.

List of IBM Patents or Patent Applications Treated as Related, Sep. 20, 2018, Total 2 pp.

* cited by examiner

DETERMINING AN ALLOCATION OF STAGE AND DESTAGE TASKS BY USING A MACHINE LEARNING MODULE

BACKGROUND OF THE INVENTION

1. Field of the Invention

The present invention relates to a computer program product, system, and method for using a machine learning module to determine an allocation of stage and destage tasks.

2. Description of the Related Art

A storage controller may manage access to a storage configured as a Redundant Array of Independent Disks (RAID) array configured to have a plurality of RAID ranks. A storage controller may include one or more device adaptors that manage the processing of I/O requests to connected storage devices. A processor node in the storage controller allocates task control blocks (TCBs) for destage tasks to destage tracks from cache to storage and allocates TCBs for stage tasks to stage data from the storage into cache. A non-volatile storage (NVS) provides a backup-copy of modified data in the cache that is removed from the NVS when the modified data is destaged to the storage. There may be a maximum number of destage TCBs allows for a RAID type and the processor node may allocate tasks for RAID ranks based on NVS usage by rank up to the maximum number of tasks allowed. For staging data in response to cache misses, there may also be a maximum number of TCBs that can be allocated, and the processor node may assign up to that maximum number for staging operations. When a task completes a staging or destaging operation, it may continue to processing the staging queue or destaging queue, respectively, of queued staging and destaging requests.

There is a need in the art for improved techniques to determine an allocation of stage and destage tasks.

SUMMARY

A First Embodiment comprises a computer program product, system, or method for using a machine learning module to determine an allocation of stage and destage tasks. Storage performance information related to processing of Input/Output (I/O) requests with respect to the storage unit is provided to a machine learning module. A computed number of stage tasks and a computed number of destage tasks are received from the machine learning algorithm. A current number of stage tasks allocated to stage tracks from the storage unit to the cache is adjusted based on the computed number of stage tasks. A current number of destage tasks allocated to destage tracks from the cache to the storage unit is adjusted based on the computed number of destage tasks.

The First Embodiment provides a dynamic technique for determining the number of destage tasks and stage tasks to process destaging and staging operations respectively, by providing storage performance information to a machine learning module. The machine learning module computes a number of stage and destage tasks to allocate that optimizes one or more currently existing storage parameters in the system, such as response time, bandwidth, NVS usage, etc.

In a Second Embodiment, the subject matter of the First and Third through Seventh Embodiments may optionally include a non-volatile storage (NVS) unit that stores modified data in the cache. The storage performance information comprises at least one of: number of tasks queued for staging operations; NVS usage; maximum NVS usage allowed; response time for processing I/O requests with respect to the storage unit; device adaptor bandwidth utilized in a device adaptor that transfers data between the cache and the storage unit; maximum device adaptor bandwidth that is available for transfer of data; and optimum device adaptor bandwidth.

The Second Embodiment provides storage performance information that is inputted to the machine learning module that takes into account NVS usage to allow for selection of destage and stage tasks that additionally maintain the NVS within proper usage levels so that there is always sufficient space in the NVS for new modified data. The Second Embodiment further optimizes among multiple storage parameters including response times, device adaptor bandwidth, NVS usage, etc. while I/O requests are being processed.

In a Third Embodiment, the subject matter of the First, Second and Fourth through Seventh Embodiments may optionally include that the storage performance information is provided to the machine learning module at a predetermined interval.

With the Third Embodiment, storage performance information is regularly provided to the machine learning module to continually produce new allocations of stage and destage tasks that are optimized based on current operating conditions so that the allocation of stage and destage tasks is continually modified to reflect current operating conditions.

In a Fourth Embodiment, the subject matter of the First through Third and the Fifth through Seventh Embodiments may optionally include saving the computed number of stage tasks and the computed number of destage tasks. The adjusting the current number of stage tasks comprises: determining whether the current number of stage tasks is less than the computed number of stage tasks; allocating additional stage tasks up to the computed number of stage tasks in response to the current number of stage tasks being less than the computed number of stage tasks. The adjusting the current number of destage tasks comprises: determining whether the current number of destage tasks is less than the computed number of destage tasks; and allocating additional destage tasks up to the computed number of destage tasks in response to the current number of destage tasks being less than the computed number of destage tasks.

With the Fourth Embodiment, the number of destage and stage tasks allocated are increased if the computed number of destage and stage tasks from the machine learning module indicates an optimal allocation greater than the current allocation. This implements the optimization by increasing tasks allocated to stage and destage operations when increasing the allocated tasks would optimize storage performance parameters.

In a Fifth Embodiment, the subject matter of the First through Fourth and the Sixth through Seventh Embodiments may optionally include in response to a destage task completing a destaging operation, determining whether the current number of destage tasks is less than the computed number of destage tasks. The destage task that completed the destaging operation to destage tracks from the cache to the storage unit are reused in response to the determining that the current number of destage tasks is less than the computed number of destage tasks. The destage task that completed the destaging operation is released in response to the determining that the current number of destage tasks is greater than the computed number of destage tasks.

In a Sixth Embodiment, the subject matter of the First through Fifth and the Seventh Embodiment may optionally include that in response to a stage task completing a staging operation, determining whether the current number of stage tasks is less than the computed number of stage tasks. The stage task that completed a staging operation to stage tracks from the storage unit to the cache is reused in response to the determining that the current number of stage tasks is less than the computed number of stage tasks. The stage task that completed the staging operation is freed in response to the determining that the current number of stage tasks is greater than the computed number of stage tasks.

With the Fifth and Sixth Embodiments, upon completing a stage and destage operation, the optimal computed numbers of stage and destage tasks are used to determine whether to immediately reuse a stage or destage task just completing the stage or destage operation, respectively, if less than the optimal number of tasks are currently assigned for the stage or destage operations. This reuse allows for immediate allocation of a task to continue with the stage or destage operation it was currently handling because all the context information for the type of operation is already configured for the task. In this way, reusing a task provides immediate allocation of resources to satisfy the computed optimal number of tasks for the stage or destage operations.

In a Seventh Embodiment, the subject matter of the First through Sixth Embodiments may optionally include that the storage unit comprises a Redundant Array of Independent Disk (RAID) rank of a plurality of RAID ranks. Each of the RAID ranks is comprised of storage devices and there is storage performance information for each of the RAID ranks. A non-volatile storage (NVS) unit stores modified data in the cache. The storage performance information for each RAID rank of the RAID ranks comprises at least one of: number of tasks queued for staging operations; speed of at least one storage device in which the RAID rank is stored; overall NVS usage of tracks from all the RAID ranks; NVS usage by the RAID rank; maximum NVS usage allowed for the RAID rank; RAID rank response time for processing I/O requests with respect to the storage unit; device adaptor bandwidth utilized in a device adaptor that transfers data between the cache and the storage unit; maximum device adaptor bandwidth that is available for transfer of data; and optimum device adaptor bandwidth.

With the Seventh Embodiment, the number of tasks to allocate is optimized separately for each RAID rank to take into account the NVS usage of total NVS usage of the RAID rank.

An Eighth Embodiment comprises a computer program product, system, or method for using a machine learning module to determine an allocation of stage and destage tasks. A machine learning module receives as input storage performance information related to processing of Input/Output (I/O) requests with respect to the storage unit. A determination is made of an adjusted number of stage tasks and an adjusted number of destage tasks. The machine learning module is retrained with the storage performance information to produce the adjusted number of stage tasks and the adjusted number of destage tasks. The retrained machine learning module is used to produce a computed number of stage tasks to allocate to staging operations and a computed number of destage tasks to allocate to destaging operations.

With the Eighth Embodiment the machine learning module is retrained to produce an adjusted number of stage and destage tasks to use for staging and destaging operations that seeks to optimize the destage and stage task allocation based on storage performance parameters.

In a Ninth Embodiment, the subject matter of the Eighth and Tenth through Fifteenth Embodiments may optionally include that the determining the adjusted number of stage tasks and the adjusted number of destage tasks and retraining the machine learning module are performed in response to completing one of a staging operation and a destaging operation.

With the Ninth Embodiment, the machine learning module is retrained and optimized to produce adjusted number of stage and destage tasks after completing a destaging or staging operation to allow for continual improvements for further staging and destaging operations.

In a Tenth Embodiment, the subject matter of the Eighth, Ninth, and Eleventh through Fifteenth Embodiments may optionally include that the determining the adjusted number of stage tasks and the adjusted number of destage tasks comprises determining a margin of error of a threshold storage parameter value of a storage parameter and a current value of the storage parameter; determining the adjusted number of stage tasks as a function of the computed number of stage tasks and the margin of error; and determining the adjusted number of destage tasks as a function of the computed number of destage tasks and the margin of error.

With the Tenth Embodiment, storage performance metrics are used to calculate a margin of error that may then be used to adjust the number of destage and stage tasks that should be allocated given the current operating and performance conditions. These adjusted number of stage and destage tasks are then used to retrain the machine learning module retrained based on an error in the storage performance metric.

In an Eleventh Embodiment, the subject matter of the Eighth through Tenth Embodiments and Twelfth through Fifteenth Embodiments may optionally include determining a first margin of error of a first threshold storage parameter value of a first storage parameter and a first current value of the first storage parameter; determining a second margin of error of a second threshold storage parameter value of a second storage parameter and a second current value of the second storage parameter, wherein the first and the second storage parameters comprise different performance metrics; determining the adjusted number of stage tasks as a function of the computed number of stage tasks and at least one of the first margin of error and the second margin of error; and determining the adjusted number of destage tasks as a function of the computed number of destage tasks and at least one of the first margin of error and the second margin of error.

With the Eleventh Embodiment, the destage and stage tasks are adjusted for retraining based on multiple storage performance parameters and metrics to allow for optimization and correction along multiple dimensions of storage parameters. The adjustment seeks to allocate destage and stage tasks based on margins of error in multiple current storage parameter values and threshold storage parameter values that indicate margins of error in current performance as compared to a desired or goal threshold performance.

In a Twelfth Embodiment, the subject matter of the Eighth through Eleventh and Thirteenth through Fifteenth Embodiments may optionally include that the function performs one of alternating using the first margin of error and the second margin of error to determine the adjusted number of stage tasks and the adjusted number of destage tasks during different iterations of performing the retraining of the machine learning module and applying both the first margin of error and the second margin of error to the computed number of stage tasks and the computed number of destage tasks to determine the adjusted number of stage tasks and the adjusted number of destage tasks, respectively.

In a Thirteenth Embodiment, the subject matter of the Eighth through Twelfth, Fourteenth, and Fifteenth Embodiments may optionally include a device adaptor that transfers data between the storage unit and the cache. The first storage parameter comprises device adaptor bandwidth and the first threshold storage parameter value comprises an optimum adaptor bandwidth for the device adaptor and wherein the first current value of the first storage parameter comprises a current adaptor bandwidth of the device adaptor, wherein the second storage parameter comprises a response time of I/O requests to tracks in the storage unit, wherein the second threshold storage parameter value comprises a maximum acceptable response time for I/O requests and wherein the second current value of the second storage parameter comprises a current response time.

With the Thirteenth Embodiment, the margins of error used to adjust the destage and stage tasks used for retraining the machine learning modules are selected to improve adaptor bandwidth and response time to optimize the allocation of tasks the machine learning module outputs for adaptor bandwidth and response time.

In a Fourteenth Embodiment, the subject matter of the Eighth through Thirteenth and Fifteenth Embodiments may optionally include that the function uses the first margin of error and the second margin of error to increase the computed number of stage tasks and the computed number of destage tasks such that the adjusted number of stage tasks and the adjusted number of destage tasks are greater than the computed number of stage tasks and the computed number of destage tasks, respectively, in response to the first margin of error and the second margin of error being positive. The function uses the first margin of error and the second margin of error to decrease the computed number of stage tasks and the computed number of destage tasks such that the adjusted number of stage tasks and the adjusted number of destage tasks are less than the computed number of stage tasks and the computed number of destage tasks, respectively, in response to the first margin of error and the second margin of error being negative.

With the Fourteenth Embodiment, to the extent the margin of error is positive, meaning the current performance threshold exceeds a current parameter value in the system, the adjusted number of stage and destage tasks may be increased even though such increase results in the current parameter value increasing, such as increasing bandwidth or response time, which is acceptable given the current operating conditions. Likewise, if the margin of error is negative, then the current performance value exceeds the performance threshold, meaning that performance parameter needs to be improved, so the numbers of stage and destage tasks need to be decreased to improve the current performance parameter with respect to the threshold. Thus, the adjusted number of tasks may be adjusted upward if current performance does not exceed a threshold.

In a Fifteenth Embodiment, the subject matter of the Eighth through Fourteenth Embodiments may optionally include that the storage unit is configured as Redundant Array of Independent Disk (RAID) ranks. Each of the RAID ranks is comprised of storage devices, wherein there is storage performance information for each of the RAID ranks. The adjusted number of stage tasks and the adjusted number of destage tasks are determined separately for each of the RAID ranks. The machine learning module comprises one of at least one machine learning module that is retrained, for each RAID rank of the RAID ranks, with the storage performance information for the RAID rank to produce the adjusted number of stage tasks and the adjusted number of destage tasks for the RAID rank.

With the Fifteenth Embodiment, destage and stage tasks may be adjusted for each of the RAID ranks in a RAID storage to optimize the allocation of destage and stage tasks for each RAID rank separately based on the specific performance conditions at each RAID rank.

DETAILED DESCRIPTION

A storage controller sends I/O requests to a storage unit, such as a RAID array of ranks. The storage controller may allocate stage tasks to stage tracks from the storage or RAID rank, to cache and allocate destage tasks to destage tracks from the cache to the storage or RAID rank. Described embodiments provide improvements to computer technology to allocate stage and destage tasks to staging and destaging operations in a storage controller. In described embodiments, numerous input parameters related to the storage performance, including storage device speed, non-volatile storage (NVS) usage, storage unit response time, and device adaptor bandwidth, are provided to a machine learning algorithm to calculate a computed number of stage tasks and a computed number of destage tasks that optimizes one or more storage parameters, such as response time, bandwidth, NVS usage, etc. The current number of stage tasks and destage tasks allocated to stage and destage operations, respectively, are adjusted based on the computed number of stage and destage tasks to dynamically modify the allocation of tasks to staging and destaging operations based on current storage performance and operational parameters.

Described embodiments provide further improvements to the computer technology for determining tasks to allocate to staging and destaging operations by determining an adjusted number of stage and destage tasks to use to retrain the machine learning module to use to produce an adjusted number of stage tasks and destage tasks to optimize task allocation according to storage performance parameters, such as response time, bandwidth, NVS usage, etc. In this way, with the described embodiments, the machine learning module is continually retrained to produce a computed number of stage and destage tasks to use for staging and destaging operations that seeks to optimize the destage and stage task allocation based on storage performance parameters.

Figure 1:
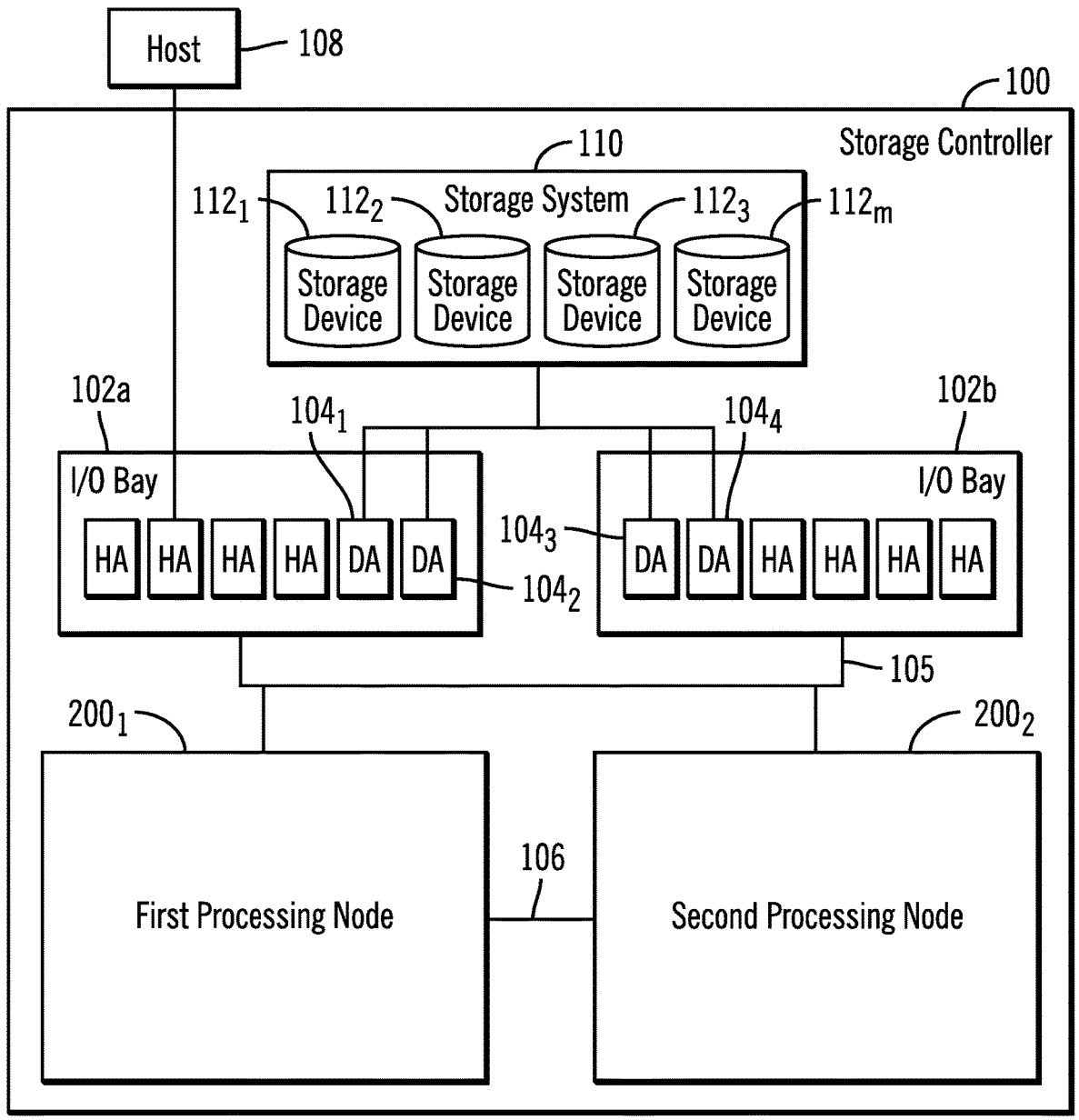
FIG. 1 illustrates an embodiment of a computing environment.

FIG. 1 illustrates an embodiment of a storage controller 100 including a plurality of independent processing nodes $200_1$, $200_2$, such as a central electronics complex (CEC), that each connect to Input/Output (I/O) bays 102a, 102b having device adaptors (DA) $104_1$, $104_2$, $104_3$, $104_4$, also referred to as storage adaptors, and host adaptors (HA) therein, over a bus interface 105, such as a Peripheral Component Interconnect Express (PCIe) bus. The processing nodes $200_1$, $200_2$ may also communicate with each other directly over a link 106, such as a PCIe bus. Host systems, such as host 108, may connect to the storage controller 100 through a host adaptor (HA) in the I/O bays 102a, 102b.

A storage system 110 includes a plurality of storage devices $112_1$ . . . $112_m$, in which tracks, logical volumes, ranks of logical contiguous storage spaces, and storage arrays, such as Redundant Arrays of Independent Disks (RAID), may be configured. Each processing node $200_1$, $200_2$ may be assigned one of the device adaptors in each of the I/O bays 104a, 104b that connect to the storage array 110 to provide access to data configured in the storage devices 112. Each processing node $200_1$, $200_2$ has a default configuration to communicate with a device adaptor (DA) $104_1$, $104_2$, $104_3$, $104_4$ in one of the I/O bays 102a, 102b, where the default configuration will assign the different processing nodes $200_1$,$200_2$ to device adaptors in the I/O bays 102a, 102b.

In the embodiment of FIG. 1, two redundant processing nodes $200_1$, $200_2$ and two I/O bays 102a, 102b are shown. In further embodiments, there may be more than the number of shown redundant elements $200_1$, $200_2$, 102a, 102b, to provide additional redundancy. Alternatively, there may be only one processing node in the system.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices $112_1$ . . . $112_m$ in the storage system 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices $112_1$ . . . $112_m$, such as Just a Bunch of Disks (JBOD), Direct Access Storage Device (DASD), Redundant Array of Independent Disks (RAID) array, virtualization device, etc. Further, the storage devices $112_1$ . . . $112_m$ in the storage 110 may comprise heterogeneous storage devices from different vendors and different types of storage devices, such as a first type of storage devices, e.g., hard disk drives, that have a slower data transfer rate than a second type of storage devices, e.g., SSDs.

Figure 2:
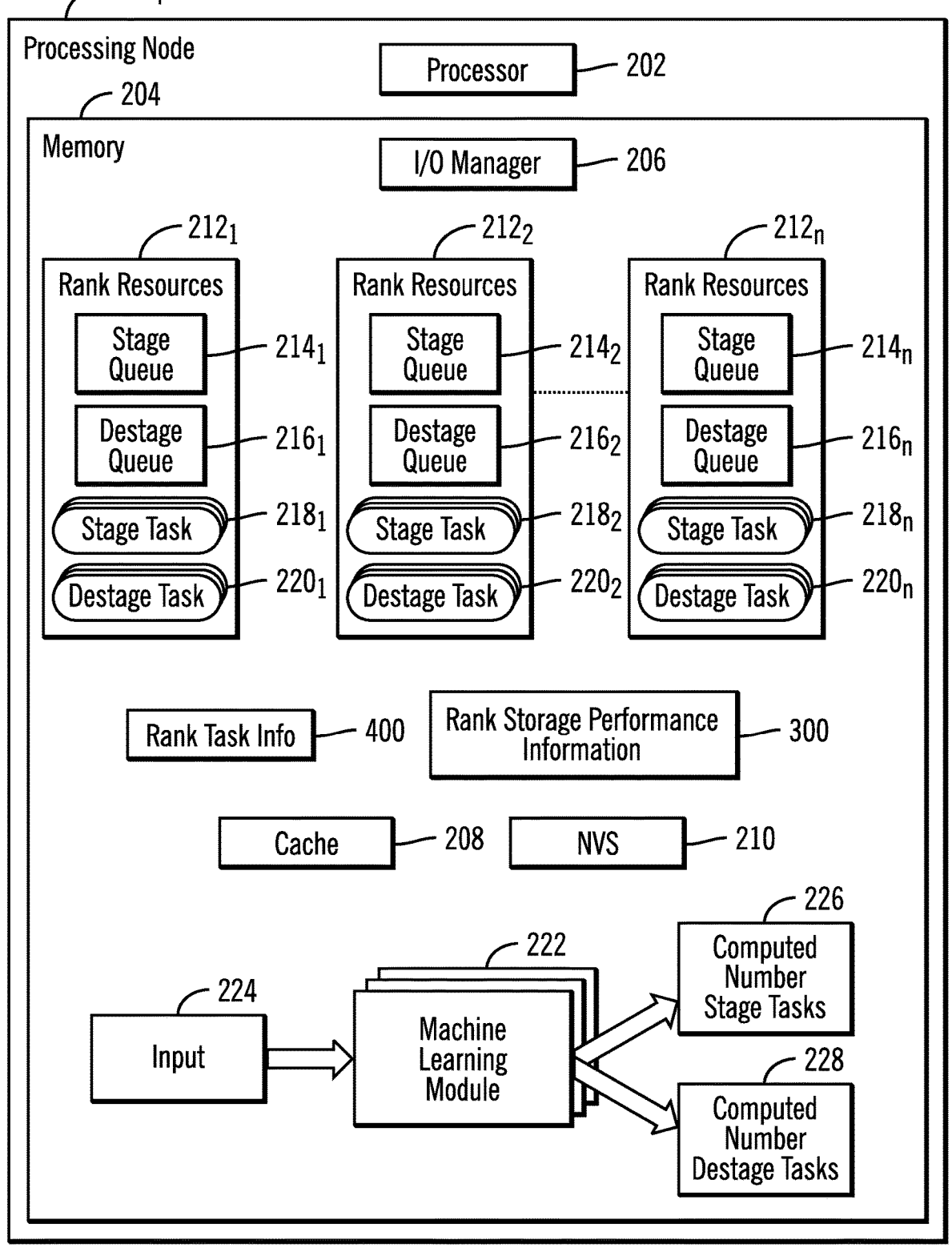
FIG. 2 illustrates an embodiment of a processing node.

FIG. 2 illustrates an embodiment of a processing node $200_i$, such as one of the processing nodes $200_1$, $200_2$, including a processor 202, such as one or more processor devices, and a memory 204 having program code executed by the processor 202. The memory 204 includes an I/O manager 206 to manage I/O requests from attached hosts 108 to storage arrays configured in the storage devices $112_1$ . . . $112_m$, and perform other related operations, such as path selection and error handling. The memory 204 further includes a cache 208 to cache tracks from the storage devices $112_1$ . . . $112_m$ and a non-volatile storage ("NVS") 210 to provide a backup storage of modified tracks in the cache 208 in another processing node $200_j$. Each processing node $200_1$, $200_2$ may be assigned groups of the storage arrays configured in the storage devices $112_1$ . . . $112_m$.

The memory 204 includes for each of the n ranks configured in the storage devices $112_1$ . . . $112_m$, rank resources $212_1$, $212_2$ . . . $212_n$ each having for the rank i a stage queue $214_1$, $214_2$ . . . $214_n$ to queue requests to stage a track from the RAID rank i, or other storage unit, e.g., volume, logical device, etc., to the cache 208 and a destage queue $216_1$, $216_2$ . . . $216_n$ to queue requests to destage a track from the cache 208 to RAID rank i, or other storage unit, e.g., volume, logical device, etc.; stage tasks $218_1$, $218_2$ . . . $218_n$ assigned to the rank i to process stage requests in the stage queue $214_1$, $214_2$ . . . $214_n$ to stage tracks; and destage tasks $220_1$, $220_2$ . . . $220_n$ assigned to the rank to process destage requests in the destage queue $216_1$, $216_2$ . . . $216_n$ to destage tracks. If there is only one storage unit, then only one instance of the resources $212_1$ are maintained for the storage unit.

The I/O manager 206 maintains rank (or other storage unit) task information 400 having information on a number of stage and destage tasks assigned and computed and rank storage performance information 300 on the ranks or other one or more storage units configured in the storage 110.

The memory 204 may include one distinct machine learning module 222 for each RAID rank, or other storage unit, configured in the storage 110 or one machine learning module for all the ranks, or one or more storage units configured in the storage 110. The machine learning modules 222 implement a machine learning technique such as decision tree learning, association rule learning, artificial neural network, inductive programming logic, support vector machines, Bayesian models, etc., to determine a computed number of stage tasks 226 for a rank i to assign to process stage requests in the stage queue $214_i$ for rank i and a computed number of destage tasks 228 for a rank i to assign to process destage requests in the destage queue $216_i$ for rank i. The I/O manager 206 may then use the outputted computed number of stage tasks 226 to determine how to modify tasks assigned to stage tasks and use the outputted computed number of destage tasks 228 to determine how to modify tasks assigned to destage tasks. The arrows shown from the input 224 to the machine learning modules 22 and to the outputs 226, 228 illustrate a flow of data to and from the machine learning module 222 and not actual structures in the memory 204.

In one embodiment, the machine learning modules 222 may comprise artificial neural network programs. Each neural network may be trained using backward propagation to adjust weights and biases at nodes in a hidden layer to produce computed number of destage tasks and stage tasks for the rank with which the machine learning module 222 is associated. The machine learning module 222 is trained to produce an allocation of destage and stage tasks to optimize and balance computational goals, such as improved response times, which is based on the speed of staging requested tracks into cache, making sure enough destage tasks are allocated so that the NVS 210 assigned to a storage unit or storage, such as a RAID rank, does not exceed an allocated percentage, and manage bandwidth used through the device adaptors $104_i$ to transfer data between the cache 208 and the storage 110. In backward propagation used to train a neural network machine learning module, margin of errors are determined based on storage parameters, such as device adaptor bandwidth and response time, and biases at nodes in the hidden layer are adjusted accordingly to decrease the error in these measured storage parameters. Backward propagation may comprise an algorithm for supervised learning of artificial neural networks using gradient descent. Given an artificial neural network and an error function, the method may calculate the gradient of the error function with respect to the neural network's weights and biases.

The I/O manager 206 and machine learning modules 222 are shown in FIG. 2 as program code loaded into the memory 204 and executed by the processor 202. Alternatively, some or all of the functions may be implemented in hardware devices in the processing nodes $200_1$, $200_2$, such as in Application Specific Integrated Circuits (ASICs) or executed by separate dedicated processors.

The cache 208 may comprise one or more memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc. The non-volatile storage ("NVS") 210 may comprise a non-volatile storage, such as NAND storage, e.g., flash memory, Solid State Drive (SSD) storage, non-volatile RAM, etc. Other non-volatile devices may be used for the non-volatile storage 210, such as a battery backed-up DIMM.

The memory 204 may comprise suitable volatile or non-volatile memory devices, including those described above.

Figure 3:
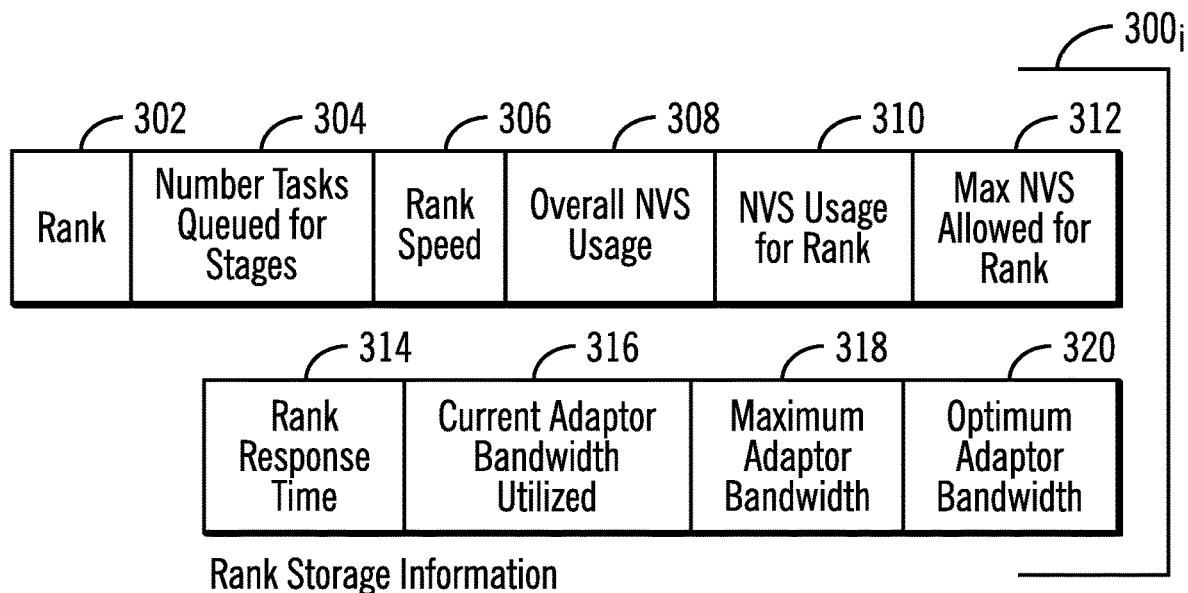
FIG. 3 illustrates an embodiment of rank storage information.

FIG. 3 illustrates an embodiment of rank storage performance information $300_i$ for a RAID rank i or other storage unit that is provided as input 224 to the machine learning module 222 to calculate the number of stage tasks 226 and destage tasks 228 to allocate to staging and destaging operation, and includes: a RAID rank (or other storage unit) identifier 302; a number of tasks queued for stages, i.e., number of requests in the stage queue $214_i$ for the storage unit 302; a RANK (or storage unit) speed 306, such as the speed of the underlying storage device(s) $112_i$ implementing the rank; overall NVS usage 308 indicating a percentage of the NVS 210 being used to store modified data for all RAID ranks or storage units; an NVS usage for the rank 310, such as the amount of space in the NVS 210 being used to store modified tracks for the rank (or other storage unit); a maximum (max) NVS allowed for the rank 312 indicating a maximum amount of space in the NVS 210 that may be used to store tracks for the rank (or other storage unit); a rank response time 314 indicating a time to respond to I/O requests for the rank; a current adaptor bandwidth utilized 316 comprising amount of bandwidth used at the device adaptor $104_i$ used to transfer data for the rank between the cache 208 and NVS 210 (storage unit); a maximum adaptor bandwidth 318 comprising a total bandwidth available at the device adaptor $104_i$ used for the rank (or storage unit) 302; and optimum adaptor bandwidth 320 predetermined for the adaptor $104_i$ used for the rank i.

Figure 4:
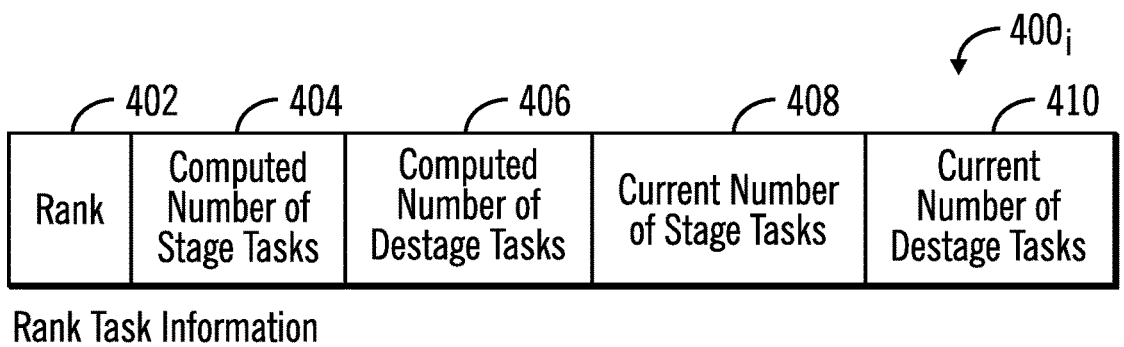
FIG. 4 illustrates an embodiment of rank task information on destage and stage tasks allocated to a rank configured in the storage.

FIG. 4 illustrates an embodiment of rank task information $400_i$ for a RAID rank i or other storage unit that is provided as input 224 to the machine learning module 222 to calculate the number of stage tasks 226 and destage tasks 228 to allocate to staging and destaging operations, respectively, and to adjust the computed number stage 226 and destage 228 tasks for use to retrain the machine learning module 222, and includes: a rank (or other storage unit) identifier 402; the computed number of stage tasks 404 comprising last computed stage tasks 226; the computed number of destage tasks 406 comprising last computed destage tasks 228; a current number of stage tasks 408 allocated to process the stage queue $214_i$; and a current number of destage tasks 410 allocated to process the destage queue $216_i$.

Any combination of the instances of information in the rank storage performance information $300_i$ and rank task information $400_i$ for rank i may be used as input 224 to the machine learning module 222. In neural network implementations, weights and biases in a hidden layer of nodes would be assigned to these inputs to indicate their predictive quality in relation to other of the inputs based on training to reach desired output values for the computed number of stage tasks 226 and destage tasks 228 to allocate for the rank i.

Figure 5:
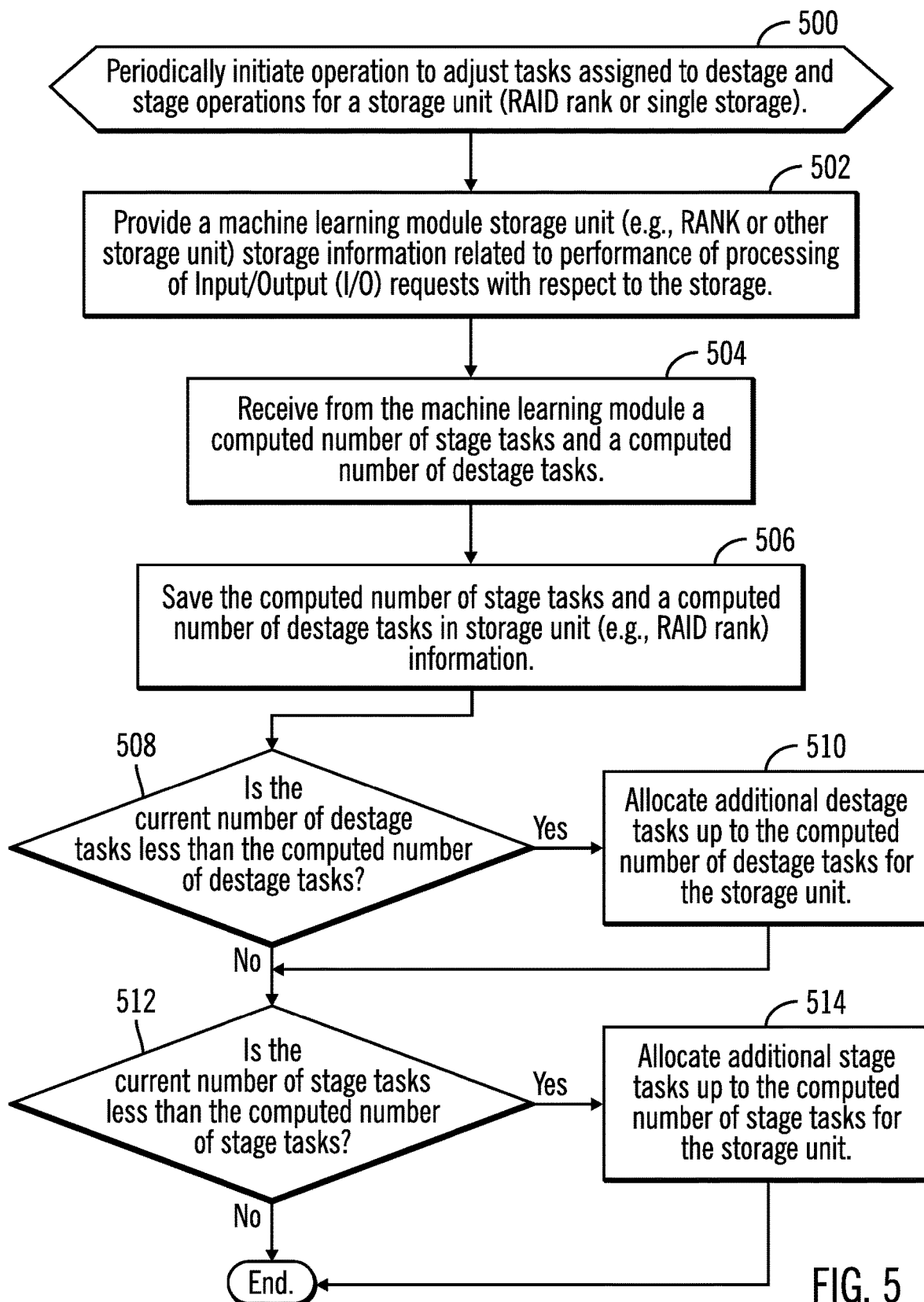
FIG. 5 illustrates an embodiment of operations to adjust tasks assigned to destage and stage operations.

FIG. 5 illustrates an embodiment of operations performed by the I/O manager 206 and/or machine learning module 222 to adjust the stage tasks $218_i$ and destage tasks $220_i$ allocated to a rank i or other storage unit. The operations of FIG. 5 may be performed periodically at an interval, e.g., 50 milliseconds or other suitable interval. The I/O manager 206 provides as input 224 to the machine learning module 222 rank (or other storage unit) storage information related to performance of processing of Input/Output (I/O) requests with respect to the rank i, including some or all of the rank storage performance information $300_i$ and the rank task information $400_i$ for the rank i or other storage unit. The machine learning module 222 then runs its machine learning algorithm based on the input 224, such as a neural network forward propagation operation to produce the computed number of stage tasks 226 and destage tasks 228 for the rank i or other storage unit, which is then received (at block 504) by the I/O manager 206. The I/O manager 206 saves (at block 506) the computed number of stage tasks 226 and destage tasks 228 in fields 404 and 406, respectively of the rank task information $400_i$.

If (at block 508) the current number of destage tasks 410 allocated for the rank i is less than the computed number of destage tasks 228 from the machine learning module 222, then the I/O manager 206 allocates (at block 510) additional destage tasks $220_i$ up to the computed number of destage tasks 228 for the rank i (or other storage unit). From the no branch of block 508 or 510, if (at block 508) the current number of stage tasks 408 allocated for the rank i is less than the computed number of stage tasks 226 from the machine learning module 222, then the I/O manager 206 allocates (at block 514) additional stage tasks $218_i$ up to the computed number of stage tasks 226 for the rank i (or other storage unit).

With the described embodiments of FIG. 5, a machine learning module 222 implementing a machine learning algorithm is used to determine the number of stage 226 and destage 228 tasks to allocate for staging and destaging operations to optimize various storage parameters, such as response times, device adaptor bandwidth, NVS usage, etc.

while I/O requests are being processed. This provides improvements over techniques that do not consider multiple storage parameter variables. Further, described embodiments provide continual adjustment of the optimum number of stage 226 and destage 228 tasks to dynamically adjust the task allocation based on multi-variable operational parameters, such as response time, NVS 210 usage, and bandwidth at the device adaptor $104_i$ servicing traffic for the storage unit.

Figure 6:
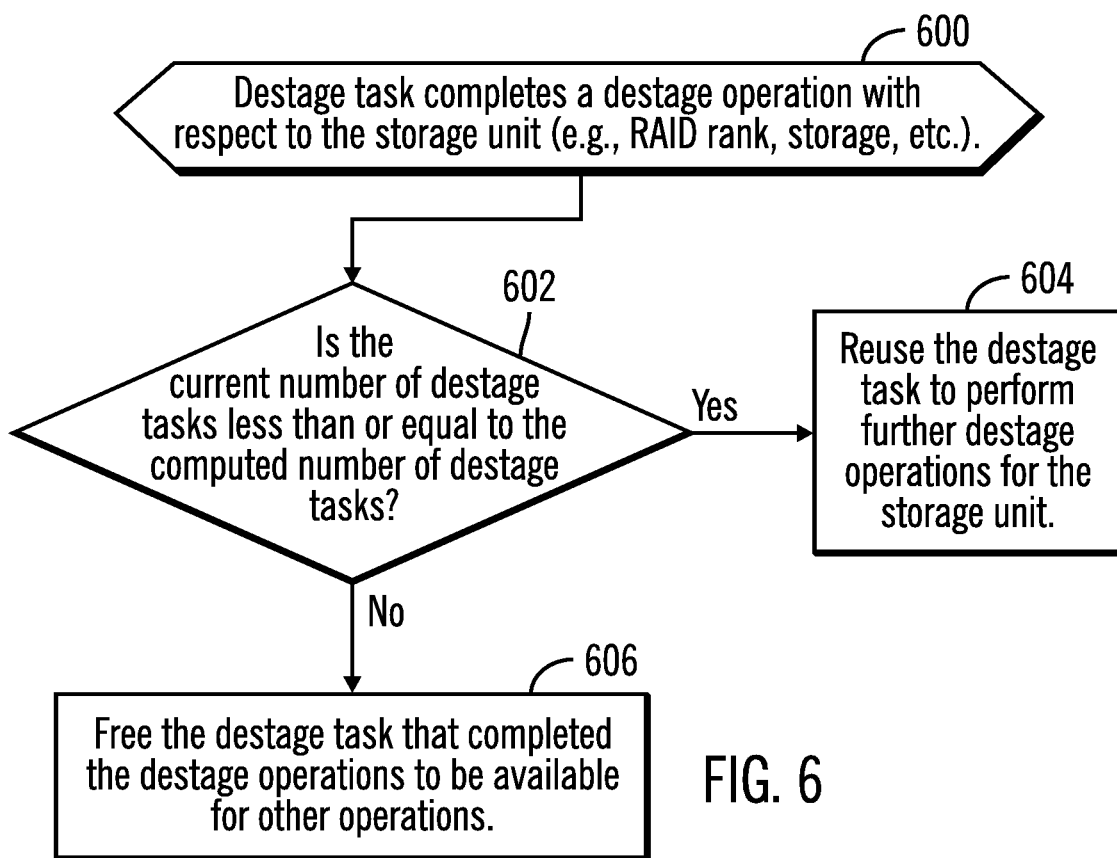
FIG. 6 illustrates an embodiment of operations to determine to adjust allocated destage tasks when completing a destaging operation.

FIG. 6 illustrates an embodiment of operations performed by the I/O manager 206 to process completion of a destage operation by a destage task $220_i$ with respect to a storage unit, e.g., RAID rank or other storage. Upon completing (at block 600) a destage operation, if (at block 602) the current number of destage tasks 410 is less than or equal to (or just less than) the last computed number of destage tasks 406, then the destage task $220_i$ just completing the destage operation is reused (at block 604), i.e., continues to process the destage queue $216_i$ in order to reach the computed number of destage tasks 406 goal. If (at block 602) the current number of destage tasks 410 is greater than the last computed number of destage tasks 406, then the destage task $220_i$ just completing the destage operation is freed (at block 606) to free the resources represented by the destage task for other operations, such as stage or destage operations.

Figure 7:
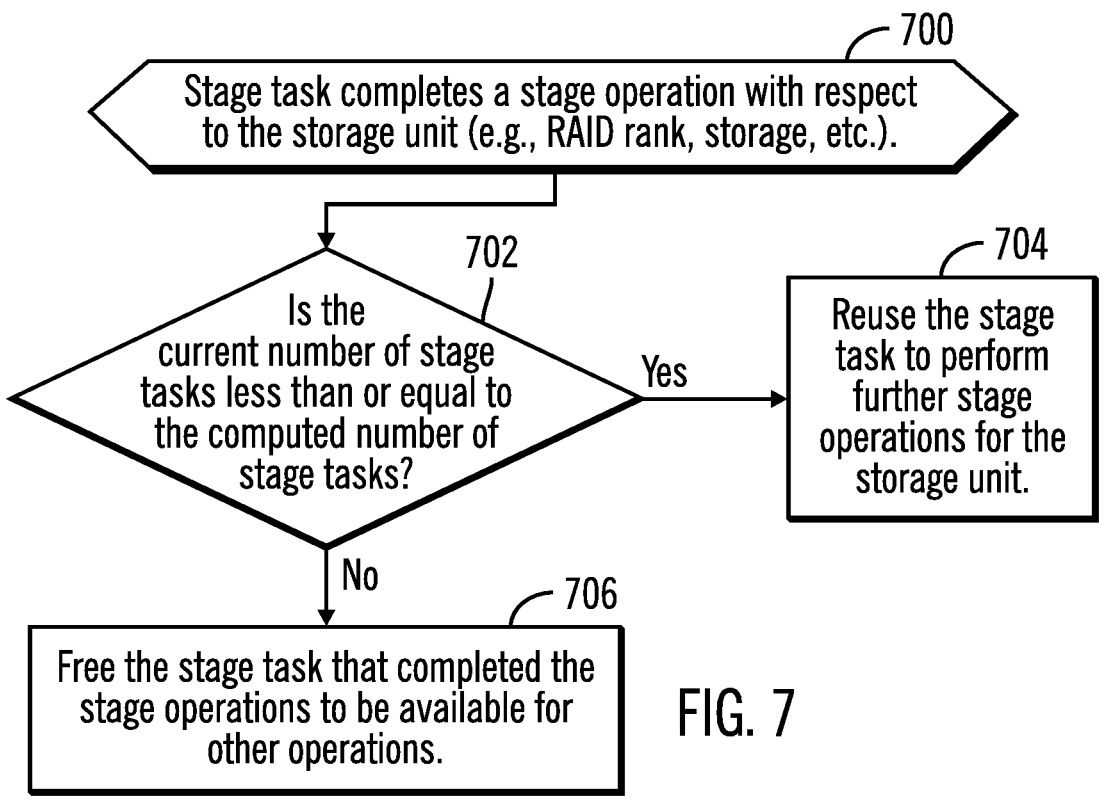
FIG. 7 illustrates an embodiment of operations to determine to adjust allocated stage tasks when completing a staging operation.

FIG. 7 illustrates an embodiment of operations performed by the I/O manager 206 to process completion of a stage operation by a stage task $218_i$ with respect to a storage unit, e.g., RAID rank or other storage. Upon completing (at block 700) a stage operation, if (at block 702) the current number of stage tasks 408 is less than or equal to (or just less than) the last computed number of stage tasks 404, then the stage task $218_i$ just completing the stage operation is reused (at block 704), i.e., continues to process the stage queue $214_i$ in order to reach the computed number of stage tasks 404 goal. If (at block 702) the current number of stage tasks 408 is greater than the last computed number of stage tasks 404, then the stage task $218_i$ just completing the stage operation is freed (at block 706) to free the resources represented by the stage task for other operations, such as stage or destage operations.

With the described operations of FIGS. 6 and 7, upon completing a stage and destage operation, the optimal computed number of stage 404 and destage 406 tasks is used to determine whether to immediately reuse a stage $218_i$ or destage task $220_i$ just completing the stage or destage operation, respectively, if less than the optimal number of tasks are currently allocated for the stage or destage operations. This reuse allows for immediate allocation of a task to continue with the stage or destage operation it was currently handling because all the context information for the type of operation is already configured for the task. In this way, reusing a task provides immediate allocation of resources to satisfy the computed optimal number of tasks for the stage or destage operations.

Figure 8:
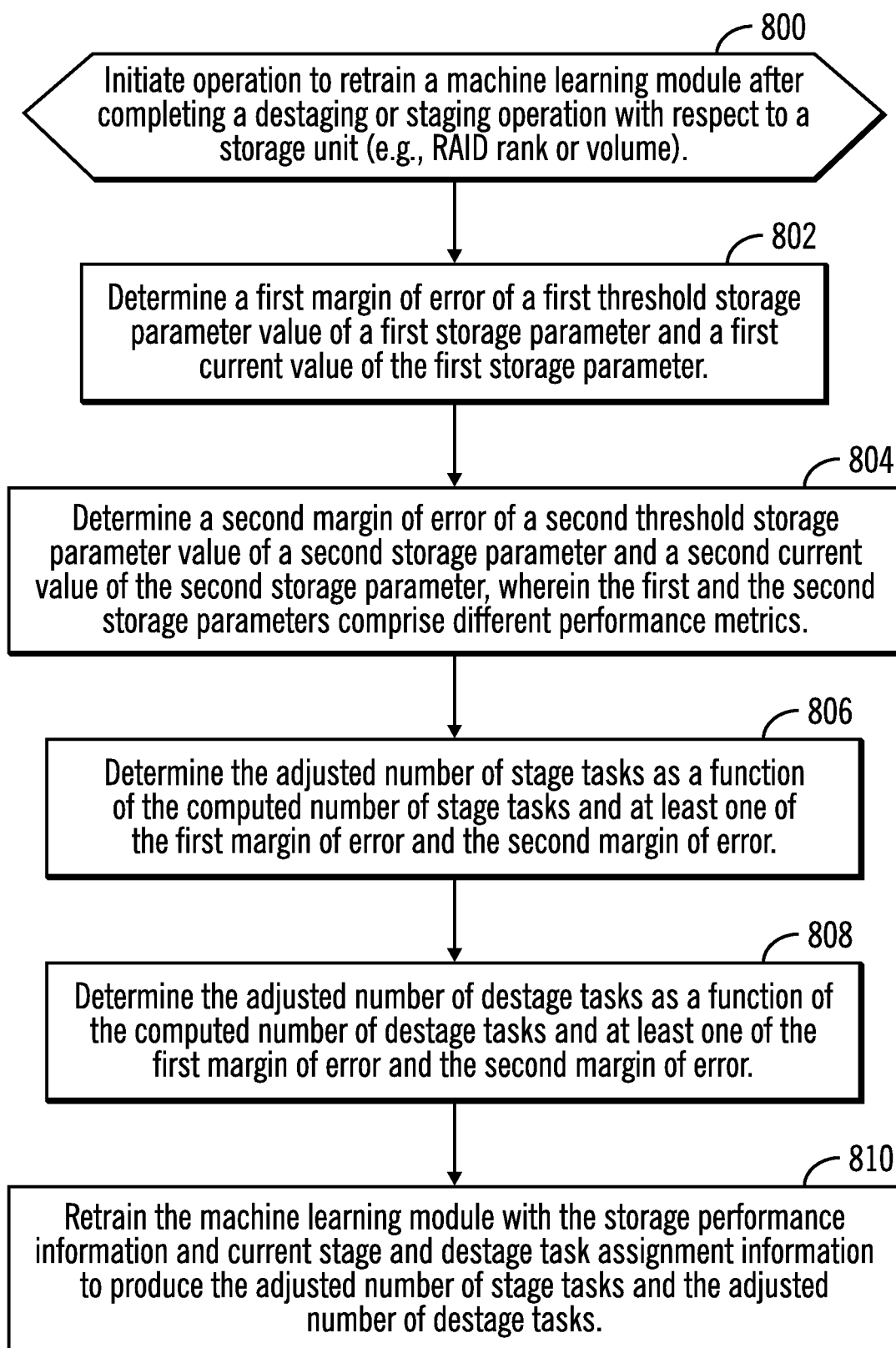
FIG. 8 illustrates an embodiment of operations to retrain a machine learning module to produce a computed number of stage and destage tasks to optimize allocation of tasks to staging and destaging operations

FIG. 8 illustrates an embodiment of operation to retrain the machine learning module 222 after completing a destaging or staging operation with respect to a storage unit, such as a RAID rank, volume, etc. In certain embodiments, the retraining may occur after each destaging or staging operation, after a predetermined number of such operations or after detecting an event, such as a performance threshold. Upon initiating (at block 800) the retraining operation, the I/O manager 206 or machine learning module 222 determines (at block 802) a first margin of error of a first threshold storage parameter value of a first storage parameter, such as a performance parameter, and a first current value of the first storage parameter. The I/O manager 206 further determines (at block 804) a second margin of error of a second threshold storage parameter value of a second storage parameter and a second current value of the second storage parameter. The first and the second storage parameters comprise different performance metrics. The I/O manager 206 determines (at block 806) an adjusted number of stage tasks as a function of the last computed number of stage tasks 404 and at least one of the first margin of error and the second margin of error. The I/O manager 206 determines (at block 808) an adjusted number of destage tasks as a function of the computed number of destage tasks 406 and at least one of the first margin of error and the second margin of error. The machine learning module 122 is retrained (at block 810) with the storage performance information $300_i$ and rank task information $400_i$ for rank or storage unit i to produce the adjusted number of stage tasks and the adjusted number of destage tasks.

In this way, multiple storage performance metrics are used to calculate margins of errors that may then be used to adjust the number of destage and stage tasks that should be allocated given the current operating conditions reflected in the rank storage performance information 300 and rank task information 400. The machine learning module 222 is then retrained to produce the optimal number of stage and destage tasks adjusted by the first and second margin of errors to remove the error from the computed stage 226 and destage tasks 228.

In one embodiment, the machine learning module 222 may alternate between using one of the first margin of error and the second margin of error to determine the adjusted number of stage and destage tasks to use to retrain the machine learning module 222. In another embodiment, a combination of the first and second margin of errors, such as an average, may be applied to determine the adjusted number of stage and destage tasks to use to retrain the machine learning module 222. For instance, the last computed number stage 404 and destage 406 tasks may be adjusted by an average of the first and second margins of errors, or some other weighted combination thereof. In an alternative embodiment, only one calculated margin of error may be used to adjust the computed number of stage and destage tasks to use to retrain the machine learning module 222.

Figure 9:
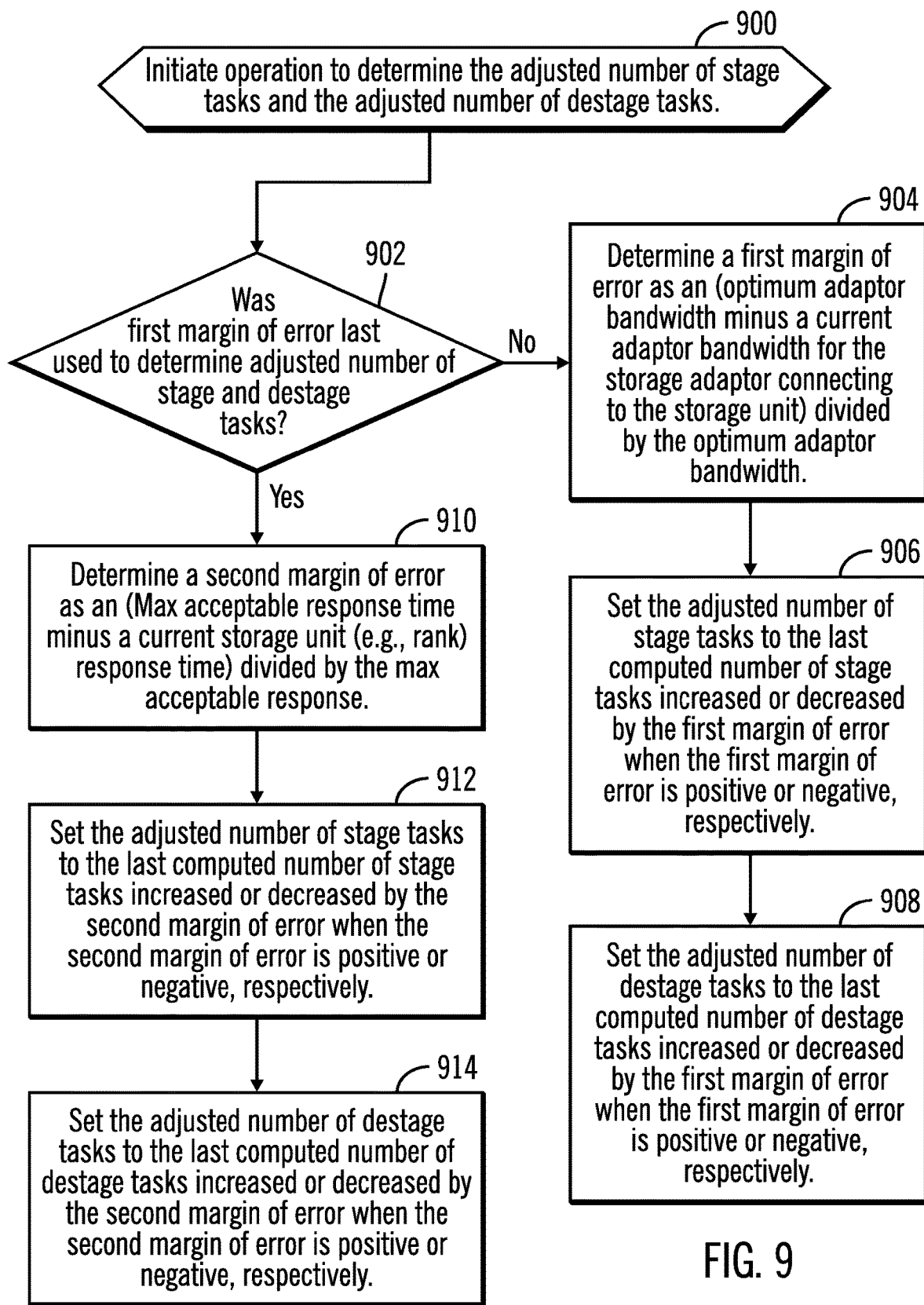
FIGS. 9 and 10 illustrate embodiments of operations to determine an adjusted number of stage and destage tasks used to retrain the machine learning module.

FIG. 9 illustrates an embodiment of operations performed by the I/O manager 206 and/or machine learning module 222 to determine the first and second margin of errors and the adjusted number of stage and destage tasks to use to retrain the machine learning module 222, such as performed at blocks 802 through 810 in FIG. 8. In the embodiment of FIG. 9, the first storage parameter is related to a device adaptor bandwidth and the second storage parameter is related to a response time at the RAID rank or storage unit for which the machine learning module 222 is being retrained. Upon initiating (at block 900) an operation to determine the adjusted number of stage and destage tasks, a determination is made (at block 902) if the first margin of error was last used to determine the adjusted number of stage and destage tasks to alternate between using the first margin of error and the second margin of error based on different storage performance parameters, such as adaptor bandwidth and I/O response time. If (at block 902) the first margin of error was not last used, then a first margin of error is determined (at block 904) as an (optimum adaptor bandwidth for the device adaptor $104_i$ minus a current adaptor bandwidth 316 for the device adaptor $104_i$ connecting to the storage unit/RAID rank divided by the optimum adaptor bandwidth for the device adaptor $104_i$ used for the storage unit or RAID rank for which the adjusted number of stage and destage tasks are being calculated.

The adjusted number of stage tasks is set (at block 906) to the last computed number of stage tasks 404 increased or decreased by the first margin of error when the first margin of error is positive or negative, respectively. The adjusted number of destage tasks is set (at block 908) to the last computed number of destage tasks 406 increased or decreased by the first margin of error when the first margin of error is positive or negative, respectively. Thus, the last computed number of stage 404 and destage tasks 406 is reduced if the optimum adaptor bandwidth is less than the current adaptor bandwidth 316 to reduce tasks to reduce the load at the device adaptor $104_i$ being used to lower bandwidth which is higher than optimal. The last computed number of stage 404 and destage 406 tasks is increased if the optimum adaptor bandwidth is greater than the current adaptor bandwidth 316 to increase the number of stage and destage tasks to improve I/O performance, such as response time and to reduce the NVS 210 usage, because the device adaptor $104_i$ has unused bandwidth that can be used to improve performance and NVS 210 usage.

If (at block 902) the first margin of error was last used, then control proceeds to block 910 to use the second margin of error, which in one embodiment may be based on a storage parameter related to a response time for processing I/O requests to the RAID rank i or storage unit being considered. At block 910, a second margin of error is determined as a (Max (maximum) acceptable response time minus a current storage unit (e.g., rank) response time 314) divided by the max acceptable response. The adjusted number of stage tasks is set (at block 912) to the last computed number of stage tasks 404 increased or decreased by the first margin of error when the first margin of error is positive or negative, respectively. The adjusted number of destage tasks is set (at block 914) to the last computed number of destage tasks 406 increased or decreased by the second margin of error when the second margin of error is positive or negative, respectively. Thus, the last computed number of stage 404 and destage tasks 406 is reduced if the maximum acceptable response time is less than the current storage unit (rank) response time 314 to reduce tasks to reduce the load at the device adaptor $104_i$ which will improve the response time by reducing traffic and latency through the device adaptor $104_i$. The last computed number of stage 404 and destage 406 tasks is increased if the maximum acceptable response time is greater than the current rank response time 314 to increase the number of stage and destage tasks to reduce the NVS 210 usage, because the response time is low enough that performance will not suffer if response time is increased to allow for more tasks to be allocated to perform more staging and destaging operations.

With the embodiment of operations of FIG. 9, the I/O manager 206 and/or machine learning module 222 alternates between using device adaptor bandwidth and response time as storage parameters to determine how to adjust the last computed number of stage tasks 404 and destage tasks 406. The embodiment of FIG. 9 separately optimizes on the device adaptor bandwidth and response time to determine how to adjust the number of stage and destage tasks to optimize bandwidth and response time, separately. In this way, the machine learning module 222 is retrained to produce computed number of stage and destage tasks to alternate the optimization on different storage parameters (bandwidth and response time).

Figure 10:
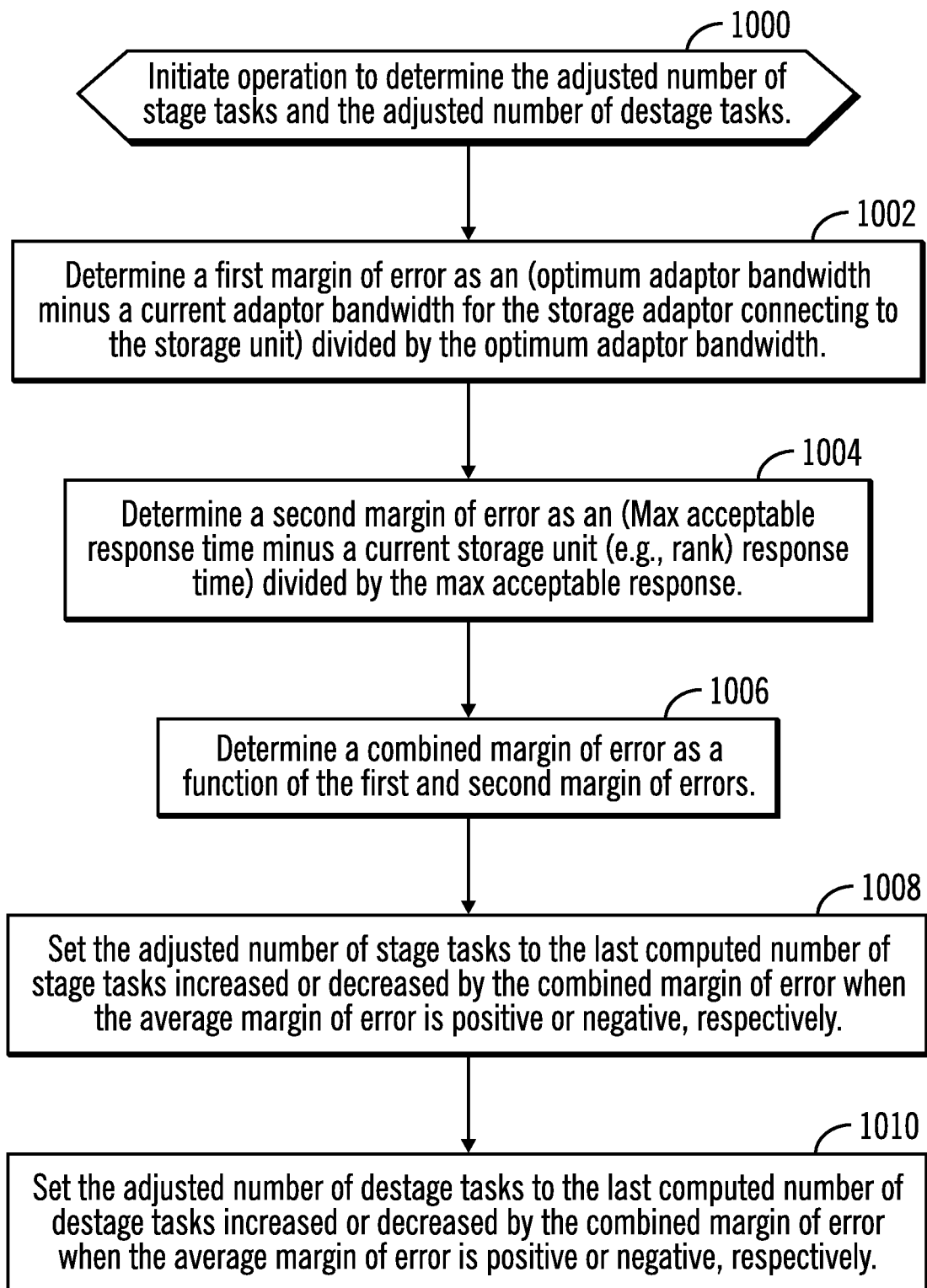

FIG. 10 illustrates an embodiment of operations performed by the I/O manager and/or machine learning module 222 to determine the first and second margin of errors and the adjusted number of stage and destage tasks to retrain the machine learning module 222, such as performed at blocks 802 through 810 in FIG. 8. In the embodiment of FIG. 10, the first storage parameter is related to a device adaptor bandwidth and the second parameter is related to a response time at the RAID rank or storage unit for which the machine learning module 222 is being retrained. Upon initiating (at block 1000) an operation to determine the adjusted number of stage and destage tasks, a first margin of error is determined (at block 1002) as an (optimum adaptor bandwidth for the device adaptor $104_i$ minus a current adaptor bandwidth 316 for the storage adaptor connecting to the storage unit/RAID rank) divided by the optimum adaptor bandwidth for the device adaptor $104_1$ for which the adjusted number of stage and destage tasks are being calculated. A second margin of error is determined (at block 1004) as a (Max acceptable response time minus a current storage unit (e.g., rank) response time 314) divided by the max acceptable response. The I/O manager 206 or machine learning module 222 determines (at block 1006) a combined margin of error as a function of the first and second margin of errors. The function may comprise an average of the first and second margin of errors. Other functions may be used to determine a combined margin of error.

The adjusted number of stage tasks is set (at block 1008) to the last computed number of stage tasks 404 increased or decreased by the combined margin of error when the combined margin of error is positive or negative, respectively. The adjusted number of destage tasks is set (at block 1010) to the last computed number of destage tasks 406 increased or decreased by the combined margin of error when the combined margin of error is positive or negative, respectively. Thus, the last computed number of stage 404 and destage tasks 406 is reduced if the combination of the optimum adaptor bandwidth and the maximum acceptable response time is less than the current adaptor bandwidth 316 and current rank response time 314, respectively, to reduce the load at the device adaptor $104_i$ being used to lower bandwidth which is higher than optimal, and to reduce the response time for the rank by lowering the bandwidth at the device adaptor $104_i$ used for the rank. The last computed number of stage 404 and destage 406 tasks is increased if the combination of the optimum adaptor bandwidth and the maximum acceptable response time is greater than the current adaptor bandwidth 316 and current rank response time 314 to increase the number of stage and destage tasks to improve I/O performance, such as response time and to reduce the NVS 210 usage, because the device adaptor $104_i$ has unused bandwidth that can be used. Further, increasing bandwidth which will result in increased response time is acceptable given that the current response time is below the acceptable response time.

With the embodiment of operations of FIG. 10, the I/O manager 206 and/or machine learning module 222 use both device adaptor bandwidth and response time as storage parameters to determine how to adjust the last computed number of stage tasks 404 and destage tasks 406. The embodiment of FIG. 10 optimizes on both the device adaptor bandwidth and response time to determine how to adjust the number of stage and destage tasks. This optimizing on both adaptor bandwidth and response time to adjust stage and destage tasks allows both parameters to be concurrently optimized upon by selecting an adjusted number of stage and destage tasks the machine learning module 222 should output that will optimize the combination of storage parameters (bandwidth and response time).

In the embodiments of FIGS. 9 and 10, the adjusted number of stage and destage tasks may be calculated by multiplying the first margin of error, the second margin of error or the combined margin of error. In alternative embodiments, the adjusted number of stage and destage tasks may be calculated using different functions than multiplication with respect to the margin of error and the computed number of stage and destage tasks.

In the above embodiments, there is one acceptable maximum response time and optimum adaptor bandwidth discussed. However, in further embodiments, there may be different acceptable maximum response times for different ranks or storage units and different optimum adaptor bandwidths for different of the device adaptors $104_i$.

In this way, described embodiments provide a dynamic technique for determining the number of destage tasks and stage tasks to process destaging and staging operations respectively, and a dynamic technique to determine when to retrain a machine learning module used to calculate the number of destage and stage tasks to use that optimize on one or more storage parameters.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
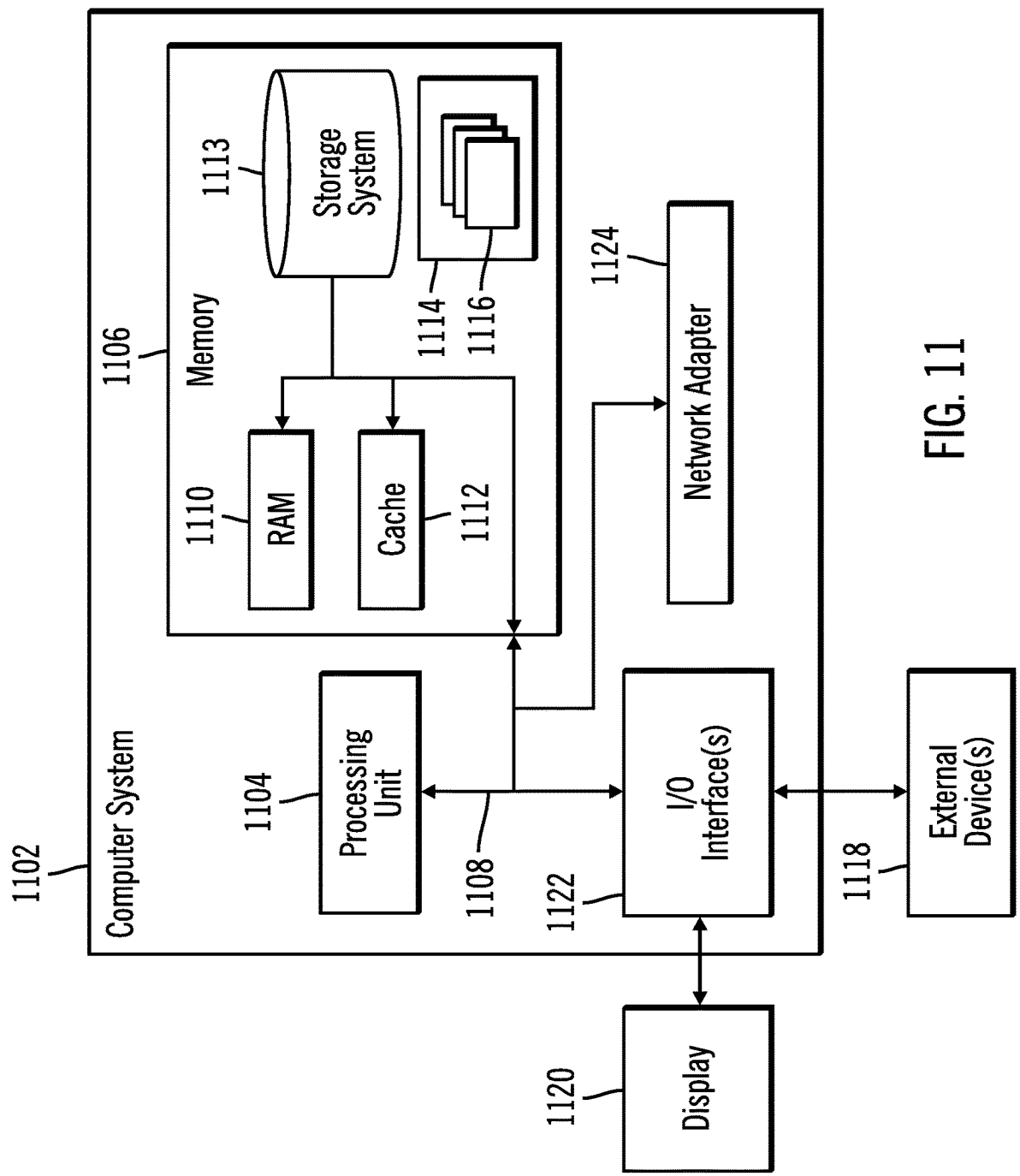
FIG. 11 illustrates a computing environment in which the components of FIG. 1 may be implemented.

The computational components of FIGS. 1 and 2, including the storage controller 100, host 108, and processing nodes $200_1$, $200_2$, $200_i$ may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for allocating tasks to stage tracks from a storage unit to a cache and destage tracks from the cache to the storage unit, comprising a computer readable storage medium having computer readable program code embodied therein that when executed performs operations, the operations comprising:
providing storage performance information related to processing of Input/Output (I/O) requests with respect to the storage unit to a machine learning module;
receiving, from the machine learning module, a computed number of stage tasks and a computed number of destage tasks;
adjusting a current number of stage tasks allocated to stage tracks from the storage unit to the cache based on the computed number of stage tasks; and
adjusting a current number of destage tasks allocated to destage tracks from the cache to the storage unit based on the computed number of destage tasks.

2. The computer program product of claim 1, wherein a non-volatile storage (NVS) unit stores modified data in the cache, wherein the storage performance information comprises at least one of:
number of tasks queued for staging operations;
NVS usage;
maximum NVS usage allowed;
response time for processing I/O requests with respect to the storage unit;
device adaptor bandwidth utilized in a device adaptor that transfers data between the cache and the storage unit;
maximum device adaptor bandwidth that is available for transfer of data; and
optimum device adaptor bandwidth.

3. The computer program product of claim 1, wherein the storage performance information is provided to the machine learning module at a predetermined interval.

4. The computer program product of claim 1, wherein the operations further comprise:
saving the computed number of stage tasks and the computed number of destage tasks;
wherein the adjusting the current number of stage tasks comprises:
determining whether the current number of stage tasks is less than the computed number of stage tasks; and
allocating additional stage tasks up to the computed number of stage tasks in response to the current number of stage tasks being less than the computed number of stage tasks; and
wherein the adjusting the current number of destage tasks comprises:
determining whether the current number of destage tasks is less than the computed number of destage tasks; and
allocating additional destage tasks up to the computed number of destage tasks in response to the current number of destage tasks being less than the computed number of destage tasks.

5. The computer program product of claim 1, wherein the operations further comprise:
in response to a destage task completing a destaging operation, determining whether the current number of destage tasks is less than the computed number of destage tasks;
reusing the destage task that completed the destaging operation to destage tracks from the cache to the storage unit in response to the determining that the current number of destage tasks is less than the computed number of destage tasks; and
freeing the destage task that completed the destaging operation in response to the determining that the current number of destage tasks is greater than the computed number of destage tasks.

6. The computer program product of claim 1, wherein the operations further comprise:
in response to a stage task completing a staging operation, determining whether the current number of stage tasks is less than the computed number of stage tasks;
reusing the stage task that completed a staging operation to stage tracks from the storage unit to the cache in response to the determining that the current number of stage tasks is less than the computed number of stage tasks; and
freeing the stage task that completed the staging operation in response to the determining that the current number of stage tasks is greater than the computed number of stage tasks.

7. The computer program product of claim 1, wherein the storage unit comprises a Redundant Array of Independent Disk (RAID) rank of a plurality of RAID ranks, wherein each of the RAID ranks is comprised of storage devices, and wherein there is storage performance information for each of the RAID ranks, wherein a non-volatile storage (NVS) unit stores modified data in the cache, wherein the storage performance information for each RAID rank of the RAID ranks comprises at least one of:
number of tasks queued for staging operations;
speed of at least one storage device in which the RAID rank is stored;
overall NVS usage of tracks from all the RAID ranks;
NVS usage by the RAID rank;
maximum NVS usage allowed for the RAID rank;
RAID rank response time for processing I/O requests with respect to the storage unit;

device adaptor bandwidth utilized in a device adaptor that transfers data between the cache and the storage unit;

maximum device adaptor bandwidth that is available for transfer of data; and optimum device adaptor bandwidth.

8. A system for allocating tasks to destaging and staging operations with respect to a storage unit, comprising:

a processor;

a cache implemented in at least one memory device;

a machine learning module; and a computer readable storage medium having computer readable program code embodied therein that when executed by the processor performs operations, the operations comprising:

providing storage performance information related to processing of Input/Output (I/O) requests with respect to the storage unit to the machine learning module;

receiving, from the machine learning module, a computed number of stage tasks and a computed number of destage tasks;

adjusting a current number of stage tasks allocated to stage tracks from the storage unit to the cache based on the computed number of stage tasks; and adjusting a current number of destage tasks allocated to destage tracks from the cache to the storage unit based on the computed number of destage tasks.

9. The system of claim 8, wherein the operations further comprise:

saving the computed number of stage tasks and the computed number of destage tasks;

wherein the adjusting the current number of stage tasks comprises:

determining whether the current number of stage tasks is less than the computed number of stage tasks; and allocating additional stage tasks up to the computed number of stage tasks in response to the current number of stage tasks being less than the computed number of stage tasks; and wherein the adjusting the current number of destage tasks comprises:

determining whether the current number of destage tasks is less than the computed number of destage tasks; and allocating additional destage tasks up to the computed number of destage tasks in response to the current number of destage tasks being less than the computed number of destage tasks.

10. A method for allocating tasks to stage tracks from a storage unit to a cache and destage tracks from the cache to the storage unit, comprising:

providing storage performance information related to processing of Input/Output (I/O) requests with respect to the storage unit to a machine learning module;

receiving, from the machine learning module, a computed number of stage tasks and a computed number of destage tasks;

adjusting a current number of stage tasks allocated to stage tracks from the storage unit to the cache based on the computed number of stage tasks; and adjusting a current number of destage tasks allocated to destage tracks from the cache to the storage unit based on the computed number of destage tasks.

11. The method of claim 10, further comprising:

saving the computed number of stage tasks and the computed number of destage tasks;

wherein the adjusting the current number of stage tasks comprises:

determining whether the current number of stage tasks is less than the computed number of stage tasks; and allocating additional stage tasks up to the computed number of stage tasks in response to the current number of stage tasks being less than the computed number of stage tasks; and wherein the adjusting the current number of destage tasks comprises:

determining whether the current number of destage tasks is less than the computed number of destage tasks; and allocating additional destage tasks up to the computed number of destage tasks in response to the current number of destage tasks being less than the computed number of destage tasks.

12. A computer program product for allocating tasks for a cache operation for a cache storing tracks from a storage unit, comprising a computer readable storage medium having computer readable program code embodied therein that when executed performs operations, the operations comprising:

providing storage performance information related to processing of Input/Output (I/O) requests with respect to the storage unit to a machine learning module;

receiving, from the machine learning module, a computed number of tasks used for the cache operation;

in response to a task completing the cache operation, determining whether a current number of tasks for the cache operation exceed or is less than the computed number of tasks;

reusing the task completing the cache operation for a subsequent instance of the cache operation in response to determining that the current number of tasks is less than the computed number of tasks; and freeing the task completing the cache operation to be available for a first operation type different from a second operation type of the cache operation in response to determining that the current number of tasks exceeds the computed number of tasks.

13. The computer program product of claim 12, wherein in a first instance the first operation type comprises a destaging operation to destage tracks from the cache to the storage unit and the second operation type comprises a staging operation to stage tracks from the storage unit to the cache, and wherein in a second instance the first operation type comprises the staging operation and the second operation type comprises the destaging operation.

14. The system of claim 8, wherein a non-volatile storage (NVS) unit stores modified data in the cache, wherein the storage performance information comprises at least one of:

number of tasks queued for staging operations;

NVS usage;

maximum NVS usage allowed;

response time for processing I/O requests with respect to the storage unit;

device adaptor bandwidth utilized in a device adaptor that transfers data between the cache and the storage unit;

maximum device adaptor bandwidth that is available for transfer of data; and optimum device adaptor bandwidth.

15. The system of claim 8, wherein the operations further comprise:
in response to a destage task completing a destaging operation, determining whether the current number of destage tasks is less than the computed number of destage tasks;
reusing the destage task that completed the destaging operation to destage tracks from the cache to the storage unit in response to the determining that the current number of destage tasks is less than the computed number of destage tasks; and
freeing the destage task that completed the destaging operation in response to the determining that the current number of destage tasks is greater than the computed number of destage tasks.

16. The system of claim 8, wherein the operations further comprise:
in response to a stage task completing a staging operation, determining whether the current number of stage tasks is less than the computed number of stage tasks;
reusing the stage task that completed a staging operation to stage tracks from the storage unit to the cache in response to the determining that the current number of stage tasks is less than the computed number of stage tasks; and
freeing the stage task that completed the staging operation in response to the determining that the current number of stage tasks is greater than the computed number of stage tasks.

17. The system of claim 8, wherein the storage unit comprises a Redundant Array of Independent Disk (RAID) rank of a plurality of RAID ranks, wherein each of the RAID ranks is comprised of storage devices, and wherein there is storage performance information for each of the RAID ranks, wherein a non-volatile storage (NVS) unit stores modified data in the cache, wherein the storage performance information for each RAID rank of the RAID ranks comprises at least one of:
number of tasks queued for staging operations;
speed of at least one storage device in which the RAID rank is stored;
overall NVS usage of tracks from all the RAID ranks;
NVS usage by the RAID rank;
maximum NVS usage allowed for the RAID rank;
RAID rank response time for processing I/O requests with respect to the storage unit;
device adaptor bandwidth utilized in a device adaptor that transfers data between the cache and the storage unit;
maximum device adaptor bandwidth that is available for transfer of data; and
optimum device adaptor bandwidth.

18. A system for allocating tasks to destaging and staging operations with respect to a storage unit, comprising:
a processor;
a cache implemented in at least one memory device;
a machine learning module; and
a computer readable storage medium having computer readable program code embodied therein that when executed by the processor performs operations, the operations comprising:
providing storage performance information related to processing of Input/Output (I/O) requests with respect to the storage unit to a machine learning module;
receiving, from the machine learning module, a computed number of tasks used for a cache operation;
in response to a task completing the cache operation, determining whether a current number of tasks for the cache operation exceed or is less than the computed number of tasks;
reusing the task completing the cache operation for a subsequent instance of the cache operation in response to determining that the current number of tasks is less than the computed number of tasks; and
freeing the task completing the cache operation to be available for a first operation type different from a second operation type of the cache operation in response to determining that the current number of tasks exceeds the computed number of tasks.

19. The system of claim 18,
wherein in a first instance the first operation type comprises a destaging operation to destage tracks from the cache to the storage unit and the second operation type comprises a staging operation to stage tracks from the storage unit to the cache, and
wherein in a second instance wherein the first operation type comprises the staging operation and the second operation type comprises the destaging operation.

20. The method of claim 10, wherein a non-volatile storage (NVS) unit stores modified data in the cache, wherein the storage performance information comprises at least one of:
number of tasks queued for staging operations;
NVS usage;
maximum NVS usage allowed;
response time for processing I/O requests with respect to the storage unit;
device adaptor bandwidth utilized in a device adaptor that transfers data between the cache and the storage unit;
maximum device adaptor bandwidth that is available for transfer of data; and
optimum device adaptor bandwidth.

21. The method of claim 10, further comprising:
in response to a destage task completing a destaging operation, determining whether the current number of destage tasks is less than the computed number of destage tasks;
reusing the destage task that completed the destaging operation to destage tracks from the cache to the storage unit in response to the determining that the current number of destage tasks is less than the computed number of destage tasks; and
freeing the destage task that completed the destaging operation in response to the determining that the current number of destage tasks is greater than the computed number of destage tasks.

22. The method of claim 10, further comprising:
in response to a stage task completing a staging operation, determining whether the current number of stage tasks is less than the computed number of stage tasks;
reusing the stage task that completed a staging operation to stage tracks from the storage unit to the cache in response to the determining that the current number of stage tasks is less than the computed number of stage tasks; and
freeing the stage task that completed the staging operation in response to the determining that the current number of stage tasks is greater than the computed number of stage tasks.

23. The method of claim 10, wherein the storage unit comprises a Redundant Array of Independent Disk (RAID) rank of a plurality of RAID ranks, wherein each of the RAID ranks is comprised of storage devices, and wherein there is storage performance information for each of the RAID ranks, wherein a non-volatile storage (NVS) unit stores modified data in the cache, wherein the storage performance information for each RAID rank of the RAID ranks comprises at least one of:
- number of tasks queued for staging operations;
- speed of at least one storage device in which the RAID rank is stored;
- overall NVS usage of tracks from all the RAID ranks;
- NVS usage by the RAID rank;
- maximum NVS usage allowed for the RAID rank;
- RAID rank response time for processing I/O requests with respect to the storage unit;
- device adaptor bandwidth utilized in a device adaptor that transfers data between the cache and the storage unit;
- maximum device adaptor bandwidth that is available for transfer of data; and
- optimum device adaptor bandwidth.

24. A method for allocating tasks to stage tracks from a storage unit to a cache and destage tracks from the cache to the storage unit, comprising:
- providing storage performance information related to processing of Input/Output (I/O) requests with respect to the storage unit to a machine learning module;
- receiving, from the machine learning module, a computed number of tasks used for a cache operation;
- in response to a task completing the cache operation, determining whether a current number of tasks for the cache operation exceed or is less than the computed number of tasks;
- reusing the task completing the cache operation for a subsequent instance of the cache operation in response to determining that the current number of tasks is less than the computed number of tasks; and
- freeing the task completing the cache operation to be available for a first operation type different from a second operation type of the cache operation in response to determining that the current number of tasks exceeds the computed number of tasks.

25. The method of claim 24,
wherein in a first instance the first operation type comprises a destaging operation to destage tracks from the cache to the storage unit and the second operation type comprises a staging operation to stage tracks from the storage unit to the cache, and
wherein in a second instance the first operation type comprises the staging operation and the second operation type comprises the destaging operation.

* * * * *